(12) United States Patent
Kelly et al.

(10) Patent No.: US 12,264,733 B2
(45) Date of Patent: Apr. 1, 2025

(54) CENTRIFUGAL ANTI-BACKLASH SCISSOR GEAR

(71) Applicant: Cummins Inc., Columbus, IN (US)

(72) Inventors: Daniel Kelly, Columbus, IN (US); Thomas Levard, Milford, OH (US)

(73) Assignee: Cummins Inc., Columbus, IN (US)

( * ) Notice: Subject to any disclaimer, the term of this patent is extended or adjusted under 35 U.S.C. 154(b) by 41 days.

(21) Appl. No.: 18/127,153

(22) Filed: Mar. 28, 2023

(65) Prior Publication Data

US 2023/0228324 A1 Jul. 20, 2023

Related U.S. Application Data

(63) Continuation of application No. PCT/US2021/071544, filed on Sep. 22, 2021.
(Continued)

(51) Int. Cl.
*F16H 55/18* (2006.01)
*F16H 57/12* (2006.01)

(52) U.S. Cl.
CPC ............. *F16H 55/18* (2013.01); *F16H 57/12* (2013.01); *F16H 2057/126* (2013.01)

(58) Field of Classification Search
CPC ..... F16H 55/18; F16H 57/12; F16H 2057/126
See application file for complete search history.

(56) References Cited

U.S. PATENT DOCUMENTS

| 3,803,935 A | 4/1974 | Nozawa |
| 5,979,259 A | 11/1999 | Shook et al. |

(Continued)

FOREIGN PATENT DOCUMENTS

| CN | 107166014 A | * | 9/2017 | ............. F16H 55/18 |
| DE | 102014007847 B3 | * | 7/2015 | ............. F16H 55/18 |

(Continued)

OTHER PUBLICATIONS

International Search Report; International Searching Authority; International Patent Application No. PCT/US2021/071544; Feb. 3, 2022; 2 pages.
(Continued)

*Primary Examiner* — Bobby Rushing, Jr.
(74) *Attorney, Agent, or Firm* — Taft Stettinius & Hollister LLP

(57) ABSTRACT

A centrifugal scissor gear assembly includes main and secondary gears with one or more counterweights or weighted balls there between. Optionally a thrust washer retains the components together. In one form, the counterweights are pivotable between the main and secondary gear. In another form, the weighted balls move within matching trenches or grooves in the main and secondary gears. When the engine is operable and the main gear is rotated, the counterweights or weighted balls are moved radially outwardly due to the centrifugal force. The scissor gear assembly can vary pre-load and apply a lower pre-load at lower engine speeds and a higher pre-load at higher engine speeds. No springs are used to achieve bias torque and no special tools or procedures are required for installation since the gear teeth of the main and secondary gears are aligned when the scissor gear assembly is not operating.

19 Claims, 11 Drawing Sheets

Related U.S. Application Data

(60) Provisional application No. 63/094,552, filed on Oct. 21, 2020.

(56) References Cited

U.S. PATENT DOCUMENTS

| | | | |
|---|---|---|---|
| 7,673,535 B2 * | 3/2010 | Sterki | ............ F16H 55/18 |
| | | | 74/574.2 |
| 9,341,253 B2 | 5/2016 | Mitchum et al. | |
| 9,777,775 B2 | 10/2017 | van Lieshout | |
| 2004/0103737 A1 | 6/2004 | Ask et al. | |
| 2015/0128740 A1 | 5/2015 | Hayashi et al. | |
| 2018/0216716 A1 | 8/2018 | Vann Lieshout | |
| 2018/0363751 A1 | 12/2018 | Demots | |

FOREIGN PATENT DOCUMENTS

| | | | | |
|---|---|---|---|---|
| FR | 2862118 A1 * | 5/2005 | ......... | F16H 55/18 |
| JP | 59026662 A * | 2/1984 | | |
| JP | 62035167 A * | 2/1987 | | |
| JP | 4327045 A | 11/1992 | | |
| JP | 2002098220 A | 4/2002 | | |
| JP | 2009156338 A | 7/2009 | | |
| WO | 2013190458 A1 | 12/2013 | | |
| WO | 2016024997 A1 | 2/2016 | | |

OTHER PUBLICATIONS

Written Opinion of the International Searching Authority; International Searching Authority; International Patent Application No. PCT/US2021/071544; Feb. 3, 2022; 6 pages.

International Preliminary Report on Patentability; International Searching Authority; International Patent Application No. PCT/US2021/071544; May 4, 2023; 7 pages.

* cited by examiner

# CENTRIFUGAL ANTI-BACKLASH SCISSOR GEAR

CROSS-REFERENCE TO RELATED APPLICATIONS

The present application is a continuation of International PCT Application No. PCT/US2021/071544 filed on Sep. 22, 2021, which claims the benefit of the filing date of U.S. Provisional Application No. 63/094,552 filed on Oct. 21, 2020, the contents of each application is incorporated herein by reference in their entirety.

TECHNICAL FIELD

The present application relates generally to a scissor gear assembly, and more particularly to a varying load capability dependent on engine speed.

BACKGROUND

A scissor gear assembly is well known in the industry and often used in combustion engines for driving cam shafts, balancer shafts, fuel injection pumps or air compressors to prevent rattling noise because of load reversals and/or crank torsion vibrations. The scissor gear assembly comprises a main and an auxiliary gear rotatable on a mutual axis. The scissor gear assembly typically includes a resilient member positioned between the main and the auxiliary gears. The resilient member has an annular shape similar to the main and auxiliary gears wherein the resilient member is typically a spring. The amount of torque that is applied by the resilient member or spring is fixed which can be problematic in effectively reducing the noise level due to gear rattle under both high and low engine operating speeds.

The main and auxiliary gears and resilient member are typically installed in a gear train system using one or more pins or tools through corresponding holes in each of the members to bring the gear teeth on the main and auxiliary gears into alignment with one another. After the scissor gear assembly is installed with the gear train system, the one or more pins or tools are removed from the scissor gear assembly so that the main and auxiliary gears are able to rotate.

Therefore, further contributions in this area of technology are needed to improve a scissor gear assembly. Therefore, there remains a significant need for the apparatuses, methods and systems disclosed herein.

SUMMARY

One embodiment is a unique system of a scissor gear assembly that includes a main gear, a secondary gear, and one or more counterweights positioned between the main and secondary gears. In a second embodiment of the scissor gear assembly, the one or more counterweights are not included but instead one or more weighted balls are positioned between the main and secondary gears. Beneficially both embodiments are configured to vary the backlash load in both high and low pre-load backlash configurations. Beneficially, there are lower noise levels with the low backlash pre-load at lower engine speeds with the scissor gear assemblies disclosed herein. Also beneficially, noise levels are lower with high backlash pre-load at higher engine speeds with the scissor gear assemblies disclosed herein. The unique design of the scissor gear assemblies enables varying a backlash pre-load such that a lower pre-load at lower engine speeds is applied to the scissor gear assemblies and as the engine speed increases the backlash pre-load also increases. The scissor gear assemblies disclosed herein are able to dynamically change the backlash pre-load by capturing the centrifugal force of the engine rpm to thereby reduce gear noise. Both embodiments operate on the same principal but achieve the results in two different ways.

Beneficially both embodiments are tunable for different load applications. For example, by changing parameters of the weighted components such as weight to pivot length, pivot to pin length, and weight mass, enables a wide range of torque that is applied up to and beyond 2,000 Nm.

Beneficially both embodiments are easy to install since the scissor gear assemblies do not have any springs, therefore no special tools or procedures are needed to install the scissor gear assembly on the gear train system or engine, thus cutting down on assembly and service time.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 1:
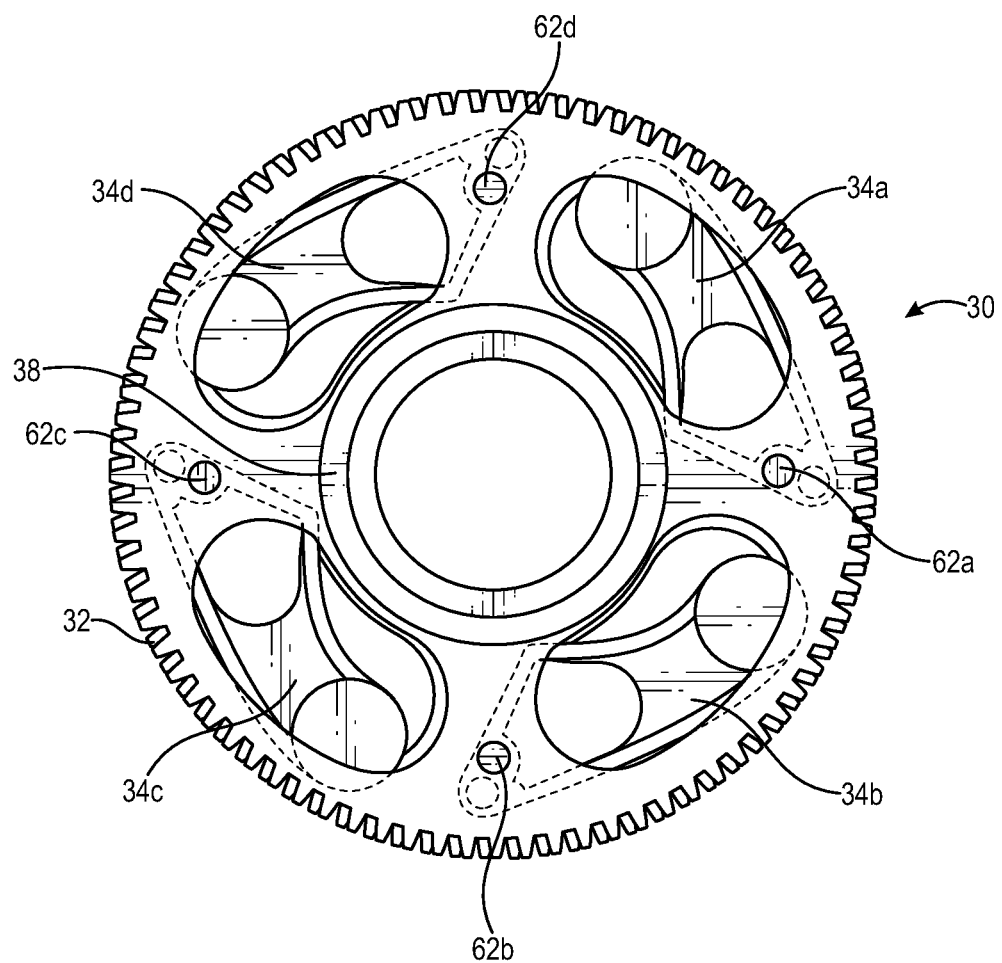
FIG. 1 is a front view of a first embodiment of a scissor gear assembly of the present disclosure.
Figure 2:
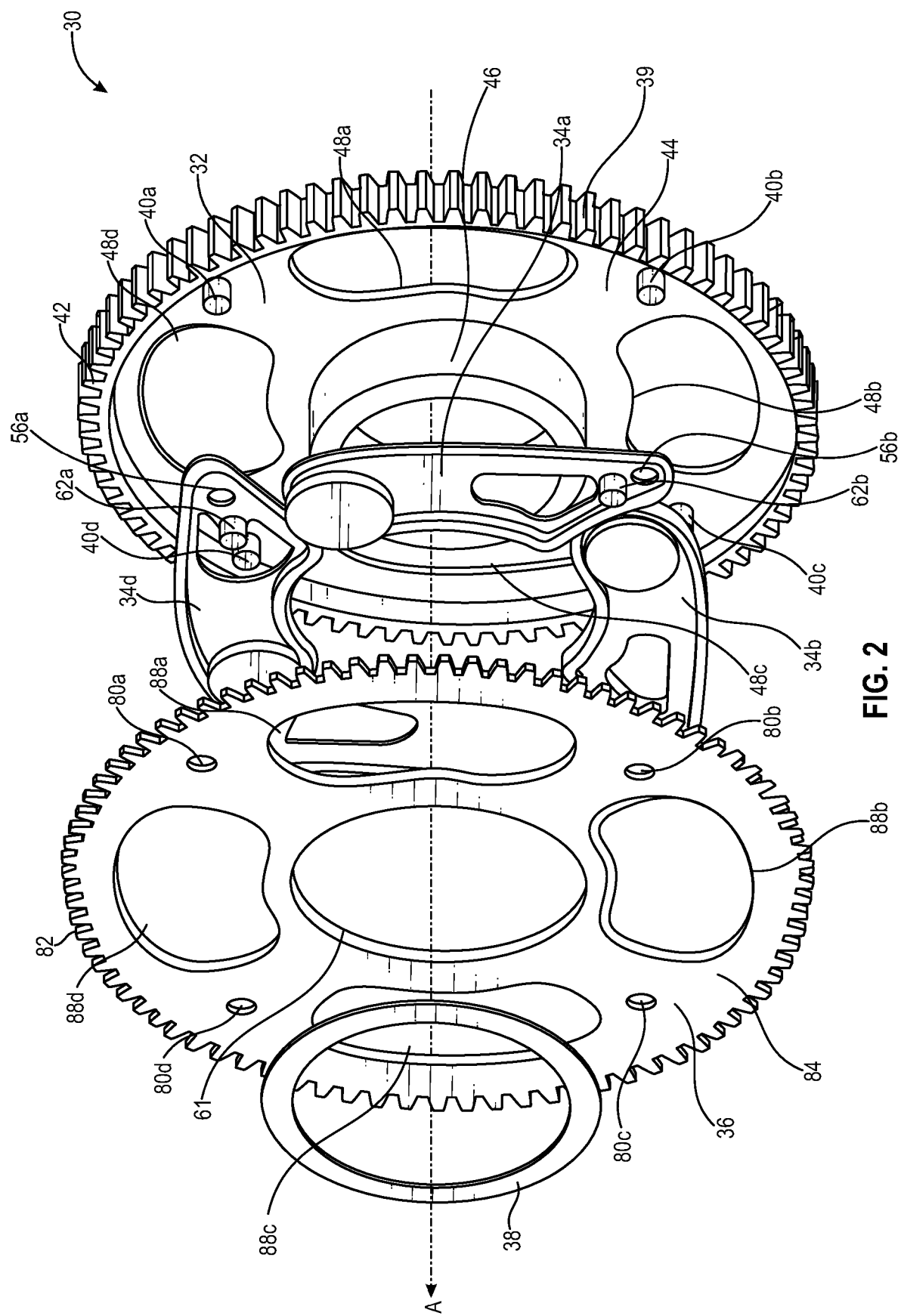
FIG. 2 is an exploded perspective view of the FIG. 1 embodiment.
Figure 3:
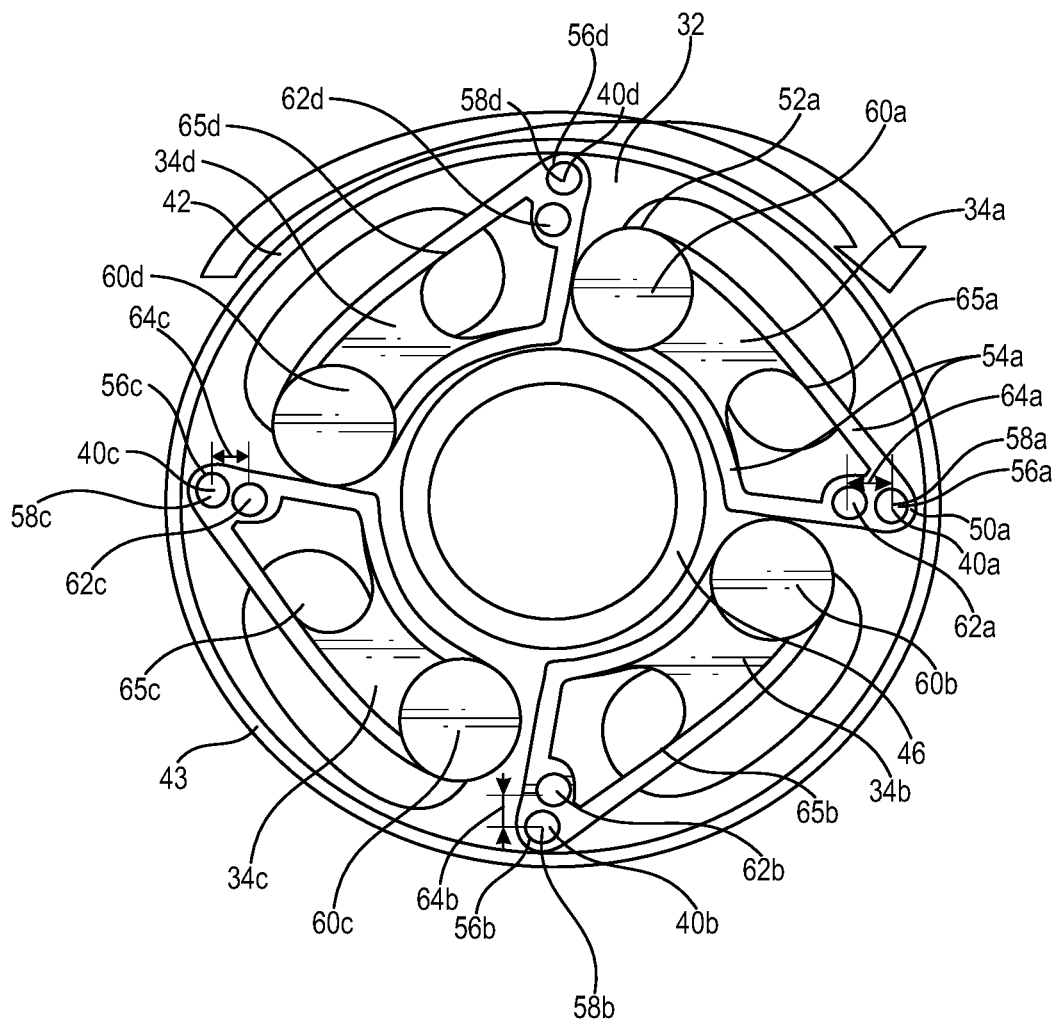
FIG. 3 is a front view of the FIG. 1 embodiment with the secondary gear and the thrust washer removed for clarity.
Figure 4:
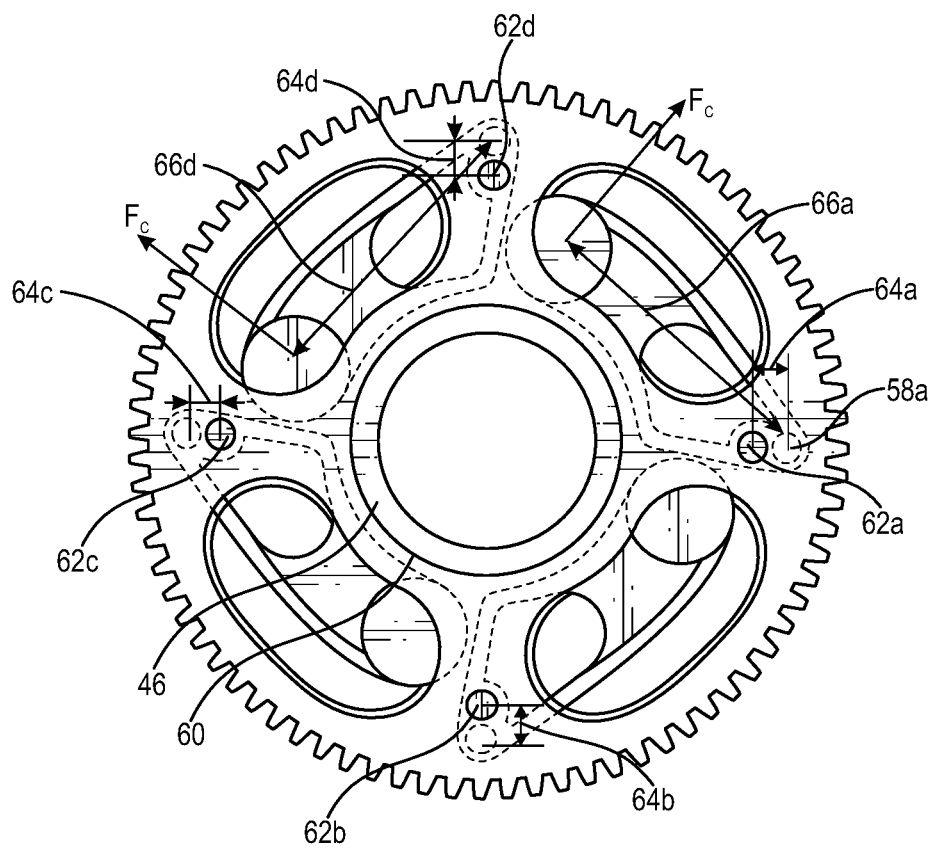
FIG. 4 is a front view of the FIG. 1 embodiment with the thrust washer removed.
Figure 5:
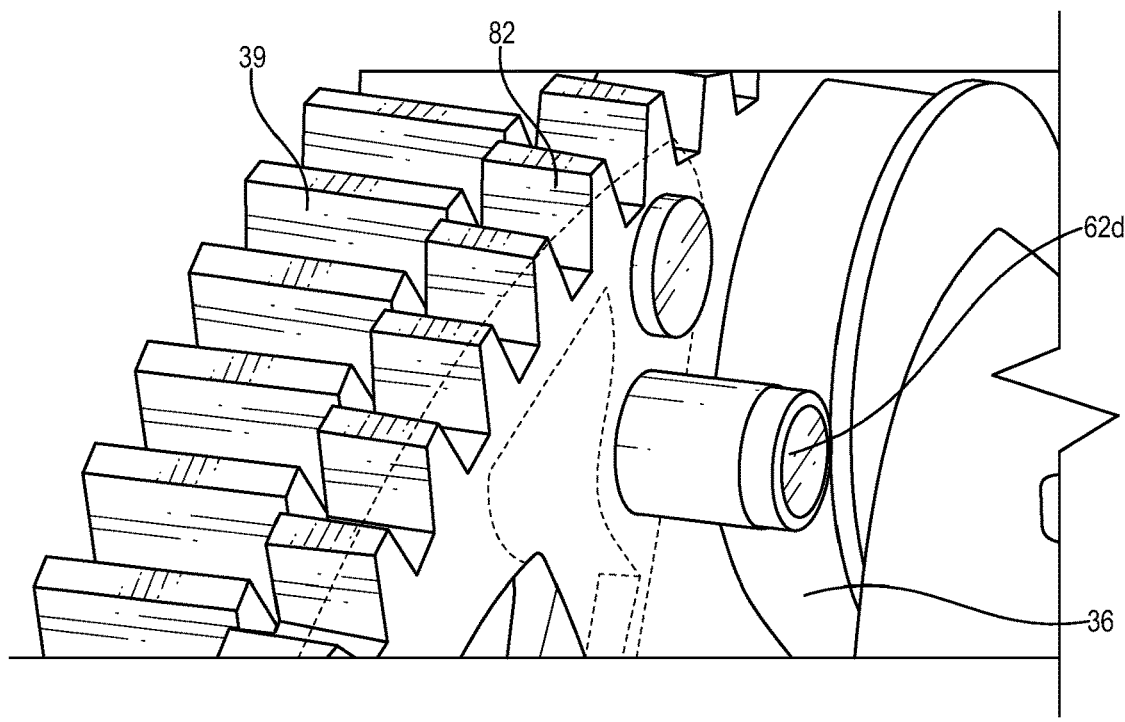
FIG. 5 is a partial perspective view of the FIG. 1 embodiment.
Figure 6:
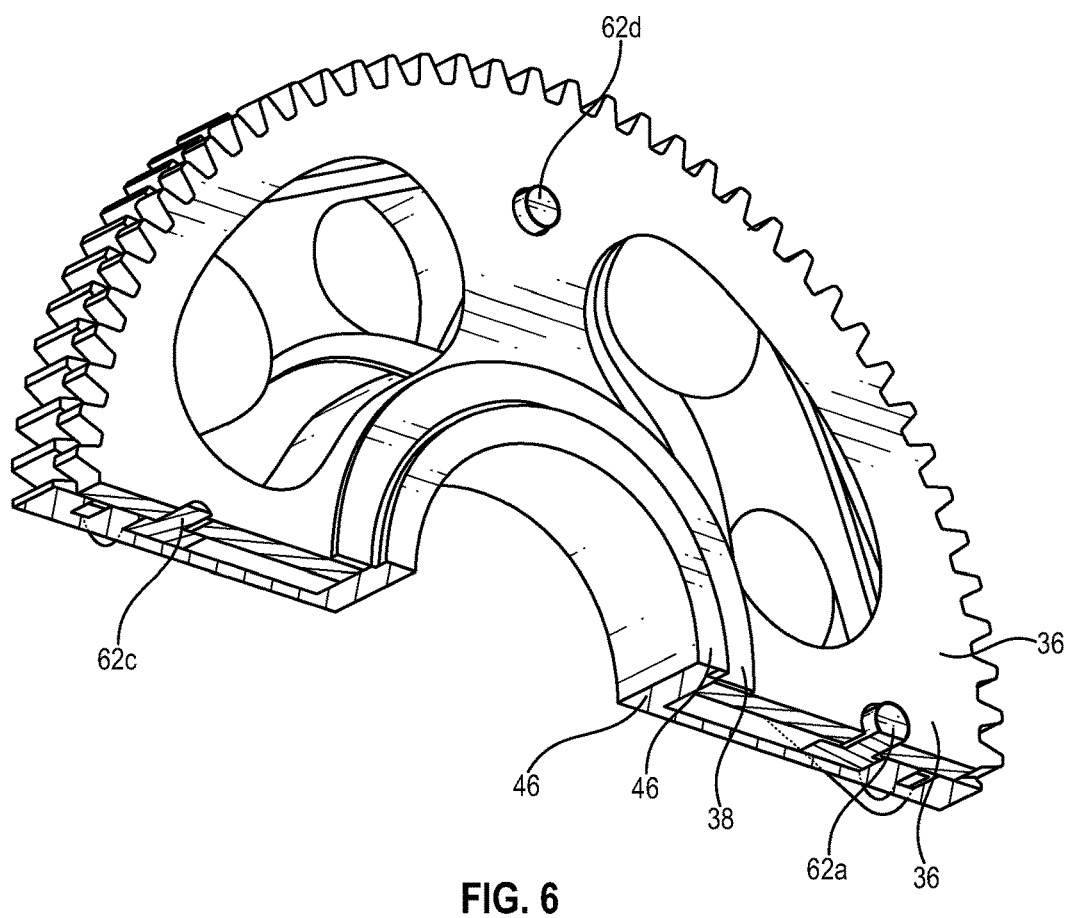
FIG. 6 is a cross-sectional perspective view of the FIG. 1 embodiment.
Figure 7:
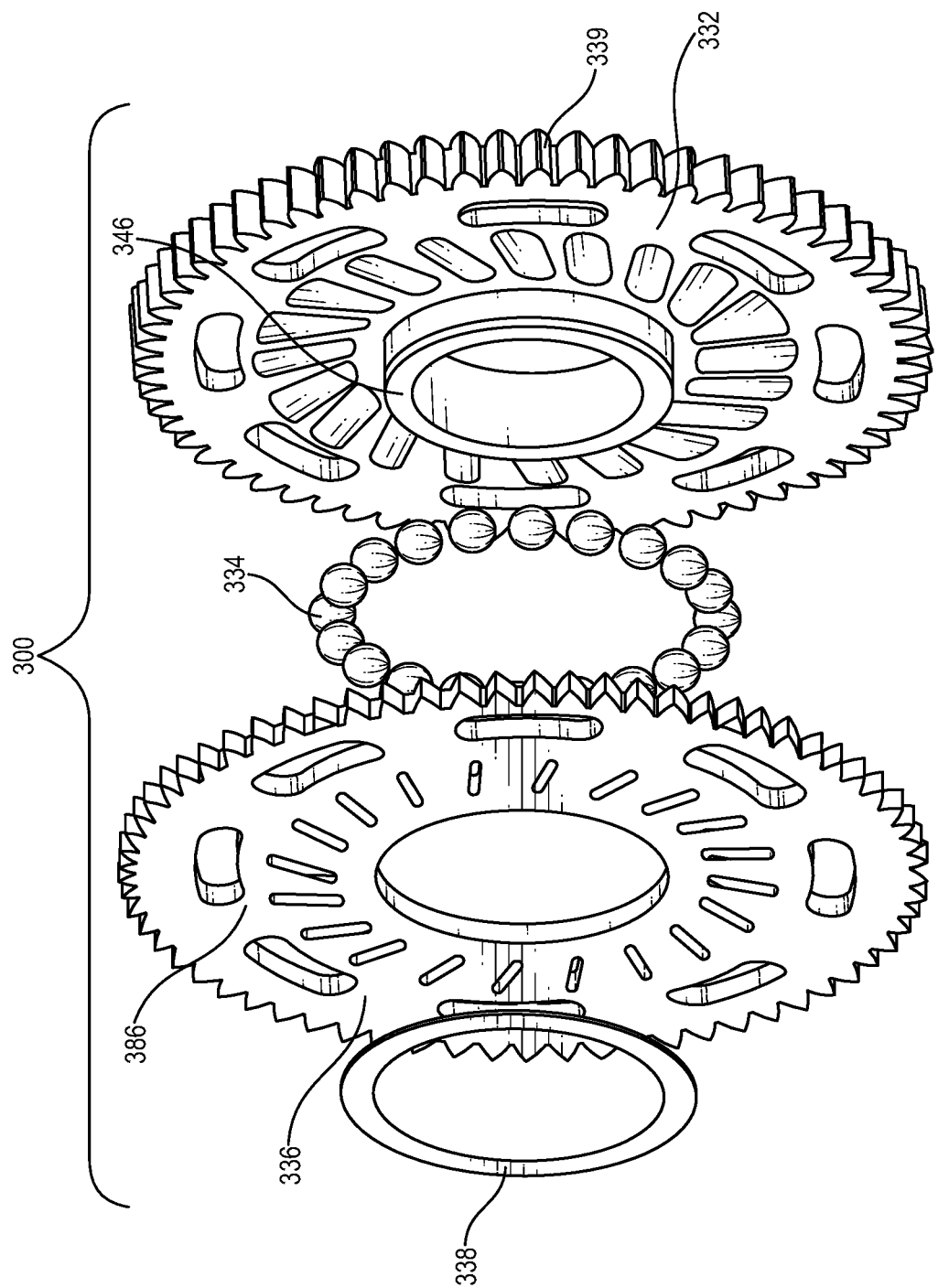
FIG. 7 is an exploded perspective view of a second embodiment of a scissor gear assembly of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Turning now to the present application with reference to FIGS. 1-6, a first embodiment of a scissor gear assembly is illustrated. A centrifugal anti-backlash scissor gear assembly 30 or scissor gear assembly 30 includes a main gear 32, one or more counterweights 34a-34d, a secondary gear 36, and optionally a thrust washer 38. As explained in more detail below, the one or more counterweights 34a-34d are positioned between the main gear 32 and the secondary gear 36 and assembled with the thrust washer 38 to retain the secondary gear 36 and the counterweights 34a-34d on the main gear 32. The one or more counterweights 34a-34d are sized to nest within the main gear 32 such that the secondary gear 36 rests against the main gear 32 when assembled together.

The scissor gear assembly 30 is a split gear that uses the rotational force of the engine to apply a bias torque to the secondary gear 36. This bias torque causes the secondary gear 36 to rotate about its axis, opposite of the rotation of the main gear 32, to apply a pre-load or pressure on the main gear 32. The result of the secondary gear 36 rotated in an opposite direction as the main gear 32 is that a plurality of secondary gear teeth 82 on the secondary gear 36 are offset from a plurality of main gear teeth 39 of the main gear 32 to thereby remove any backlash in the gear train system (not illustrated) and continue to maintain tooth contact while the engine is operating.

The scissor gear assembly 30 accounts for varying a pre-load with a lower pre-load at lower engine speeds and as the engine speed increases, the pre-load increases as well by using the centrifugal force of the engine. The scissor gear assembly 30 can vary the load capability dependent on engine speed and can be tuned to achieve different load capabilities.

The main gear 32 includes a plurality of main gear teeth 39 adjacent a rim 42 that extend around the circumference of the main gear 32. The main gear 32 also includes one or more main pins 40a-40d that are positioned on a mating face 44 of the main gear 32 and adjacent the rim 42. In an alternative embodiment, the main gear 32 includes one or more main holes instead of one or more main pins 40a-40d. The rim 42 extends away from the mating face 44 and forms an outer boundary 43 that serves to limit movement of the one or more counterweights 34a-34d and retain the one or more counterweights 34a-34d within the main gear 32 when the scissor gear assembly 30 is operational. The mating face 44 includes a retainer or hub 46 that extends away from the mating face 44 such that the retainer 46 is sized to receive and retain the thrust washer 38 and the secondary gear 36 thereon when assembled with these components. The retainer 46 is circular with a diameter that is smaller than a secondary opening 61 in the secondary gear 36. The retainer 46 also serves as an inner boundary for the one or more counterweights 34a-34d when the scissor gear assembly 30 is at rest or non-operational. The main gear 32 includes one or more openings 48a-48d however in other embodiments the main gear 32 may not include any openings. The one or more openings 48a-48d are of a similar size and shape as one or more openings 88a-88d of the secondary gear 36 such that in a non-operational or resting condition, the openings 48a-48d substantially align with the openings 88a-88d.

Each of the one or more counterweights 34a-34d are of the same shape and size and include similar details therefore only counterweight 34a will be described. In other forms, the counterweights 34a-34d can have a different shape and size than those illustrated in FIGS. 1-6. Moreover, in another embodiment, the scissor gear assembly 30 can include more or less counterweights.

The counterweight 34a includes an attachment end portion 50a opposite a weighted end portion 52a with one or more ribs 54a that extend between the attachment end portion 50a and the weighted end portion 52a. Beginning with the attachment end portion 50a, the counterweight 34a includes a pivot hole 56a therein. The pivot hole 56a aligns with and receives the main pin 40a on the main gear 32 to assemble the counterweight 34a onto the main gear 32. The counterweight 34a is rotatable about a pivot axis 58a of the pivot hole 56a when the main pin 40a is received in the pivot hole 56a to assemble the counterweight 34a onto the main gear 32. In an alternative embodiment, the attachment end portion 50a of the counterweight 34a includes a pivot pin instead of the pivot hole 56a. The pivot pin aligns with the main hole of the main gear 32.

The counterweight 34a includes a weight pin 62a in the attachment end portion 50a wherein the weight pin 62a is adjacent to the pivot hole 56a with an arm lever length 64a that spans between pivot axis 58a of the pivot hole 56a and the weight pin 62a. The weight pin 62a is configured for insertion into a secondary gear hole 80a of the secondary gear 36 to assemble the counterweight 34a with the secondary gear 36. The counterweight 34a is linked to the secondary gear 36 offset of the pivot axis 58a by a determined amount dependent on application and torque requirements. As can be appreciated, the counterweight 34a is rotatably connected with the main gear 32 and the secondary gear 36. In an alternative embodiment, the counterweight 34a includes a weight hole instead of the weight pin 62a. The weight hole is configured to receive a secondary pin on the secondary gear 36 in the alternative embodiment.

The weighted end portion 52a of the counterweight 34a includes a weight 60a. The weight 60a is an amount of weight mass that can be adjusted to vary the amount of torque applied to the main gear 32 and the secondary gear 36 when the scissor gear assembly 30 is operational. By changing the amount of weight mass of the weight 60a, the mechanical advantage will change. The weighted end portion 52a and the weight 60a are both circular in shape but can be any configuration. The weight 60a functions as a counterweight when the scissor gear assembly 30 is operational. As the engine begins to rotate and the main gear 32 is rotated, the weight 60a is thrown outwardly relative to a central axis A of the scissor gear assembly 30 and towards the rim 42 and the outer boundary 43 that limit movement of the weight 60a to retain the counterweight 34a within the main gear 32. As the engine begins to rotate, the weight 60a rotates about the main pin 40a and the weight 60a moves closer to the rim 42 due to the centrifugal force Fc.

The counterweight 34a is attached to the main gear 32 via the connection of the main pin 40a and the pivot hole 56a in which the counterweight 34a pivots or rotates on the pivot axis 58a. The distance between the main pin 40a and the pivot axis 58a of the pivot hole 56a is an arm lever length 64a. The counterweight 34a is linked to the secondary gear 36 via the connection of the weight pin 62a into the secondary gear hole 80a. The distance between the weight 60a and the main pin 40a is illustrated as an arm length 66a. The mechanical advantage is calculated from the distance ratio of the arm length 66a to the arm lever length 64a. The placement of the weight pin 62a adjacent the pivot hole 56a and the main pin 40a enables the secondary gear 36 to rotate opposite of the main gear 32.

The arm length 66a can vary, such as by changing the position of the weight 60a or the position of the pivot hole 56a, to affect the centrifugal force Fc and the mechanical advantage. The arm lever length 64a can vary, such as by changing the position of the pivot hole 56a or the position of the weight pin 62a, to affect the centrifugal force Fc and the mechanical advantage. The amount of mass or weight of the weight 60a can vary to affect the centrifugal force Fc and the mechanical advantage. The location of the weight pin 62a and the secondary gear hole 80a can vary to affect the centrifugal force Fc and the mechanical advantage. As the main gear 32 begins to rotate, the weight 60a of the counterweight 34a moves outwardly and rotates about the pivot axis 58a due to the centrifugal force Fc. The centrifugal force Fc is amplified by a mechanical advantage calculated from a distance ratio of the arm length 66a to the arm lever length 64a. Both hi and low pre-load configurations were used. Beneficially, the scissor gear assembly 30 has slightly lower noise levels with the low pre-load at lower engine speeds, while noise levels were slightly lower with hi pre-load at higher engine speeds. Prior art scissor gears have a fixed torque that is applied by a type of spring. With the unique design of the scissor gear assembly 30 it is capable of having a varying pre-load, a lower pre-load at lower engine speeds and as the engine speed increases the pre-load increases as well. By changing parameters of the weighted components such as weight to pivot length or arm length 66a, pivot to pin length or arm lever length 64a, and weight mass of the weight 60a, a wide range of torque can be applied up to and beyond 2,000 Nm.

The counterweight 34a includes one or more ribs 54a that extend between the attachment end portion 50a and the weighted end portion 52a. The counterweight 34a includes an opening 65a positioned between the two ribs 54a. In other embodiments, additional ribs 54 and openings 65a may be included in the counterweight 34a. One benefit of the opening 65a is to reduce the amount of weight or mass of the counterweight 34a near the attachment end portion 50a and thereby increase the centrifugal force and effects of the weight 60a when the scissor gear assembly 30 is operational.

The secondary gear 36 includes a plurality of secondary gear teeth 82 that extend around the circumference of the secondary gear 36. The plurality of secondary gear teeth 82 are configured to align with the plurality of the main gear teeth 39 when the secondary gear 36 is assembled with the main gear 32, and the secondary gear 36 and the main gear 32 are in a resting position that includes non-operation of the scissor gear assembly 30. As can be appreciated, the alignment of the plurality of the secondary gear teeth 82 with the plurality of main gear teeth 39 in a non-operational or at rest condition of the scissor gear assembly 30 eliminates the need for special tools or processes to install the scissor gear assembly 30 as compared to a traditional scissor gear in which the gear teeth are not-aligned when the traditional scissor gear is in a resting position and thereby require alignment of the gear teeth to install the traditional scissor gear. In a resting position, the scissor gear assembly 30 is easily installed with a gear train assembly (not illustrated) without rotation of the secondary gear 36 and/or main gear 32 because the plurality of secondary gear teeth 82 are aligned with the plurality of main gear teeth 39. Since the gear assembly 30 does not have any springs, there are no special tools or procedures to install on the engine, thus cutting down on assembly and service time. During operation of the engine, the plurality of secondary gear teeth 82 and the plurality of main gear teeth 39 become unaligned to remove the backlash in the gear train assembly and maintain tooth contact between the plurality of secondary gear teeth 82 and the plurality of main gear teeth 39.

The secondary gear 36 includes one or more secondary gear holes 80a-80d that are configured to receive the weight pins 62a-62d of the one or more counterweights 34a-34d to assemble the one or more counterweights 34a-34d with the secondary gear 36. In an alternative embodiment, the secondary gear 36 includes one or more secondary pins sized for insertion into one or more holes of the counterweight 34a. The secondary gear 32 includes a mating face 84 opposite a non-mating face 86. The secondary gear 36 includes a secondary opening 61 that spans between the mating face 84 and the non-mating face 86, wherein the secondary opening 61 is sized slightly larger than the retainer 46 to receive the retainer 46 therein when the secondary gear 36 is assembled with the main gear 32. The secondary opening 61 is circular with a diameter that is similar to a diameter for the retainer 46. The secondary gear 36 includes one or more openings 88a-88d however in other embodiments the secondary gear 36 may not include any openings or may include fewer or more openings. In the illustrated embodiment, the openings 88a-88d are a similar shape and size as the openings 48a-48d.

The thrust washer 38 is assembled on the retainer 46 to hold or retain the secondary gear 36 and counterweights 40a-40d onto the main gear 32.

Figure 13:
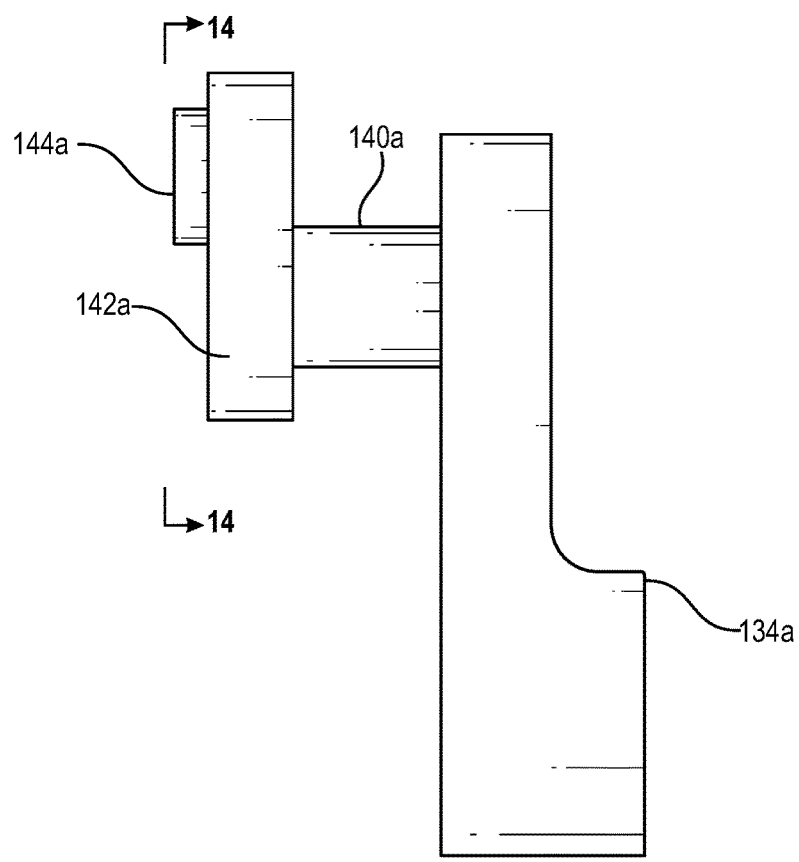
FIG. 13 is a side view of an alternative embodiment of a counterweight.
Figure 14:
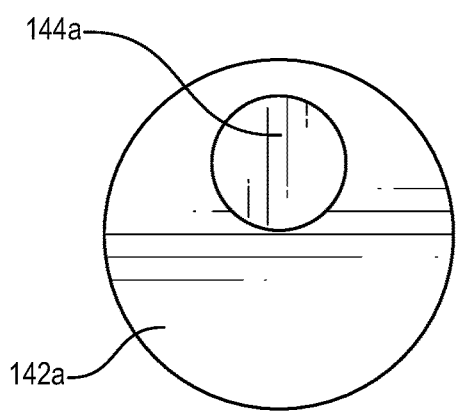
FIG. 14 is a partial front view of the FIG. 13 embodiment.
Figure 15:
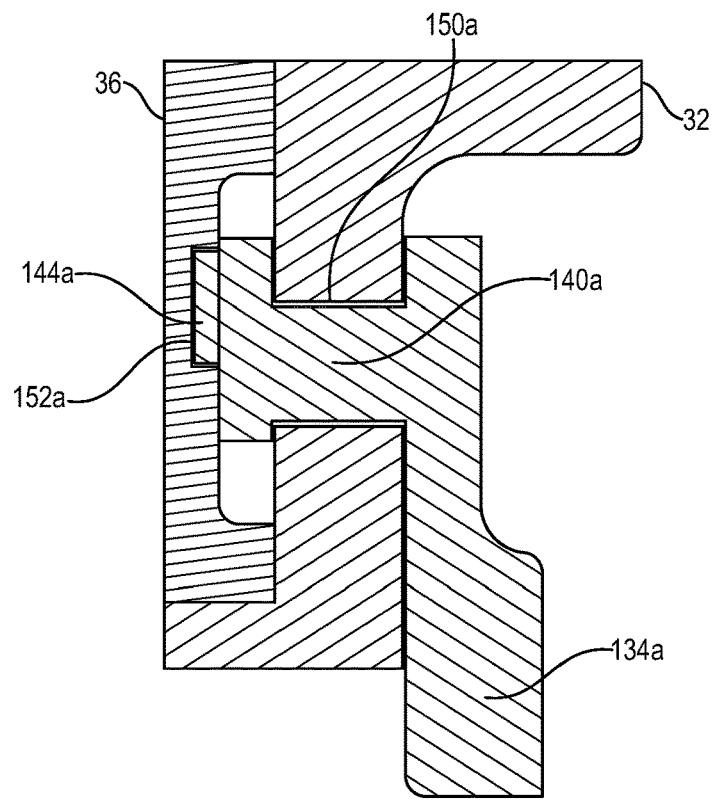
FIG. 15 is a partial cross-sectional view of the FIG. 13 embodiment assembled with a main gear and a secondary gear.

In an alternative embodiment illustrated in FIGS. 13-15, the counterweight 134a is similar to counterweight 34a unless otherwise described. However, the counterweight 134a is not assembled between the main gear 32 and the secondary gear 36 and instead the counterweight 134a is positioned on a non-mating face of the main gear 32. The counterweight 134a includes a weight shaft 140a that passes or extends through the main gear 32 via holes 150a through the main gear 32. The counterweight 134a includes a cam shaft 142a connected to weight shaft 140a, wherein the cam shaft 142a includes a cam pin 144a that acts as the mechanical advantage to apply the bias torque to the secondary gear 36. The secondary gear 36 includes a cam pin hole 152a that is sized to receive the cam pin 144a. The number of holes 150a, cam pin holes 152a, and counterweights 134a, including variation in size and length of the counterweights 134a, can vary dependent on the amount of bias torque needed.

Figure 16:
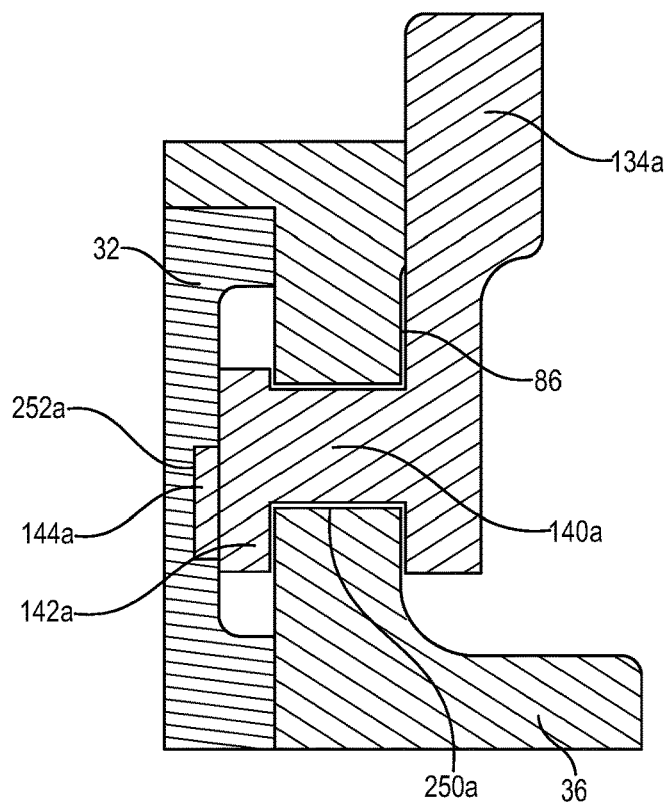
FIG. 16 is a partial cross-sectional view of an alternative embodiment of a counterweight assembled with a main gear and a secondary gear.

In an alternative embodiment illustrated in FIG. 16, the counterweight 134a is positioned on a non-mating face 86 of the secondary gear 36 such that the counterweight 134a is not assembled between the main gear 32 and the secondary gear 36. The weight shaft 140a passes or extends through the secondary gear 36 via holes 250a through the secondary gear 36. The main gear 32 includes a cam pin hole 252a that is sized to receive the cam pin 144a to mount the cam pin 144a in the cam pin hole 252a on main gear 32. The number of holes 250a, cam pin holes 252a, and counterweights 134a, including variation in size and length of the counterweights 134a, can vary dependent on the amount of bias torque needed.

Turning now to the present application with reference to FIGS. 7-12, a second embodiment of a scissor gear assembly is illustrated. A centrifugal dynamic scissor gear assembly 300 or scissor gear assembly 300 includes a main gear 332, a plurality of weighted balls 334, a secondary gear 336, and optionally a thrust washer 338. As explained in more detail below, the plurality of weighted balls 334 are positioned between the main gear 332 and the secondary gear 336. The thrust washer 338 is assembled with the main gear 332 to retain the plurality of weighted balls 334 between the secondary gear 336 and the main gear 332 and to retain the secondary gear 336 with the main gear 332. The plurality of weighted balls 334 are sized to nest between the main gear 332 and the secondary gear 336 such that the secondary gear 336 rests against the main gear 332 when assembled. The plurality of weighted balls 334 act in unison to achieve a bias torque from the centrifugal force when the engine is operated. During operation of the engine, the force from the movement outwardly of the plurality of weighted balls 334 is summed or is cumulative such that the more mass that is thrown outwardly, the greater the centrifugal force.

The scissor gear assembly 300 accounts for varying a pre-load with a lower pre-load at lower engine speeds and as the engine speed increases, the pre-load increases as well by using the centrifugal force of the engine. The scissor gear assembly 300 can vary the load capability dependent on engine speed and can be tuned to achieve different load capabilities.

The main gear 332 includes a plurality of main gear teeth 339 that extend around the circumference of the main gear 332. The main gear 332 also includes a plurality of main gear trenches or channels 340 that are positioned on a mating face 344 of the main gear 332. The mating face 344 is substantially flat to contact a mating face 345 of the secondary gear 336. The plurality of main gear trenches or channels 340 are configured to receive a corresponding number of the plurality of weighted balls 334 such that each of the main gear trenches 340 receives one of the weighted balls 334. Moreover, the plurality of main gear trenches 340 corresponds with a plurality of secondary gear trenches 380 of the secondary gear 336 such that one of the main gear trenches 340 will align with one of the secondary gear trenches 380 to retain one of the weighted balls 334 therein. Moreover, as described below, the main gear trenches 340 and the secondary gear trenches 380 have the same orientation including length, width, depth, and angle relative to the central axis of the corresponding gear.

Each of the plurality of main gear trenches 340 is the same therefore only a single trench will be described next. The main gear trench 340 is positioned on a trench angle A relative to a line B measured from a central axis through the center of the main gear 332. The main gear trench 340 has a width W that corresponds to the diameter of the weighted ball 334. The main gear trench 340 has a length L that facilitates an amount of torque that is desired for application to the main gear 332. The main gear trench 340 has a depth that corresponds to a radius of the weighted ball 334.

The main gear 332 includes a retainer or hub 346 that extends away from the mating face 344 such that the retainer 346 is sized to receive and retain the thrust washer 338 and the secondary gear 336 thereon when assembled with these components. The retainer 346 is circular with a diameter that is smaller than a secondary opening 361 in the secondary gear 336. The main gear 332 includes one or more openings 348a-348h however in other embodiments the main gear 332 may not include any openings. The one or more openings 348a-348h are of a similar size and shape as one or more openings 388a-388h of the secondary gear 336 such that in a non-operational or resting condition, the openings 348a-348h substantially align with the openings 388a-388h. The one or more openings 388a-388h and the openings 348a-348h are useful for airflow or weight reduction.

The secondary gear 336 includes a plurality of secondary gear teeth 382 that extend around the circumference of the secondary gear 336. The plurality of secondary gear teeth 382 are configured to align with the plurality of the main gear teeth 339 when the secondary gear 336 is assembled with the main gear 332, and the secondary gear 336 and the main gear 332 are in a resting position that includes non-operation of the scissor gear assembly 330. As can be appreciated, the alignment of the plurality of the secondary gear teeth 382 with the plurality of main gear teeth 339 in a non-operational or at rest condition of the scissor gear assembly 330 eliminates the need for special tools or processes to install the scissor gear assembly 330 as compared to a traditional scissor gear in which the gear teeth are not-aligned when the traditional scissor gear is in a resting position and thereby require alignment of the gear teeth to install the traditional scissor gear. In a resting position, the scissor gear assembly 330 is easily installed with a gear train assembly (not illustrated) without rotation of the secondary gear 336 and/or main gear 332 because the plurality of secondary gear teeth 382 are aligned with the plurality of main gear teeth 339. Since the gear assembly 330 does not have any springs, there are no special tools or procedures to install on the engine, thus cutting down on assembly and service time. During operation of the engine, the plurality of secondary gear teeth 382 and the plurality of main gear teeth 339 become unaligned, as described below, to remove the backlash in the gear train assembly and maintain tooth contact between the plurality of secondary gear teeth 382 and the plurality of main gear teeth 339.

The secondary gear 336 includes a plurality of secondary gear trenches or channels 380 that are positioned on a mating face 345 of the secondary gear 336. The mating face 345 is substantially flat to contact a mating face 344 of the main gear 332. The secondary gear 332 includes the mating face 345 being opposite a non-mating face 386. The secondary gear 336 includes a secondary opening 361 that spans between the mating face 345 and the non-mating face 386, wherein the secondary opening 361 is sized slightly larger than the retainer 346 to receive the retainer 346 therein when the secondary gear 336 is assembled with the main gear 332. The secondary opening 361 is circular with a diameter that is similar to a diameter for the retainer 346. The secondary gear 336 includes one or more openings 388a-388h however in other embodiments the secondary gear 336 may not include any openings or may include fewer or more openings. In the illustrated embodiment, the openings 388a-388h are a similar shape and size as the openings 348a-348d such that the openings 388a-388h and 348a-348d are aligned when the plurality of secondary gear teeth 382 are aligned with the plurality of the main gear teeth 339 when the secondary gear 336 is assembled with the main gear 332, and the secondary gear 336 and the main gear 332 are in a resting position.

Figure 8:
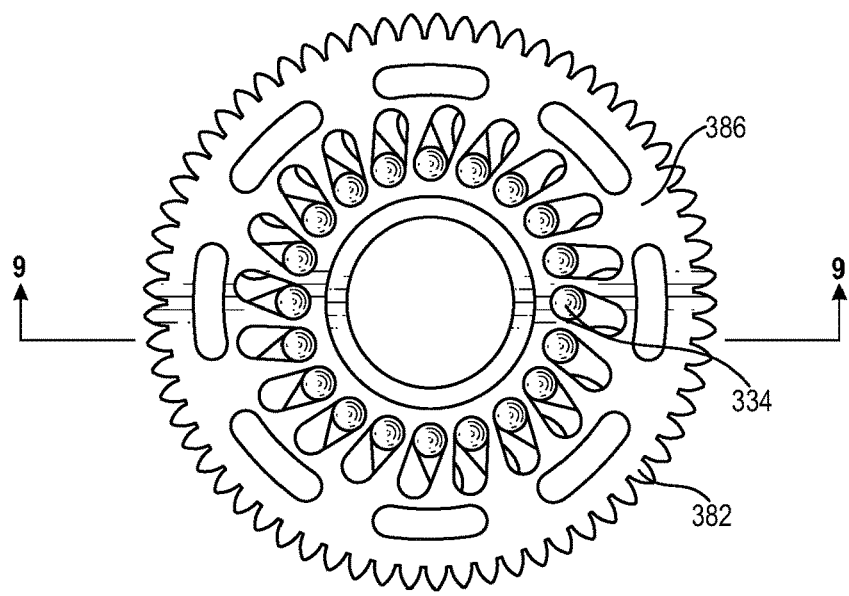
FIG. 8 is front view of the FIG. 7 embodiment with the thrust washer removed for clarity.
Figure 9:
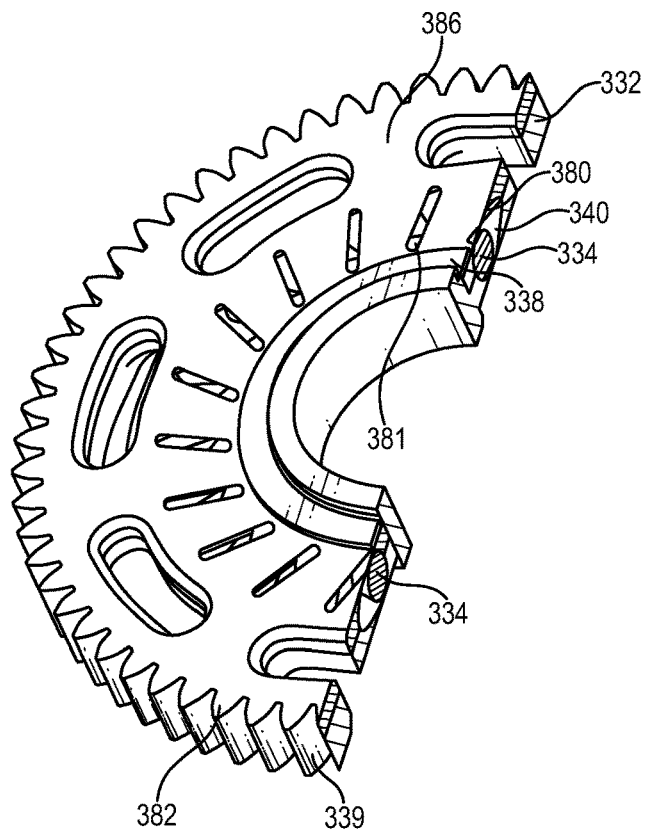
FIG. 9 is a cross-sectional perspective view of the FIG. 7 embodiment.
Figure 10:
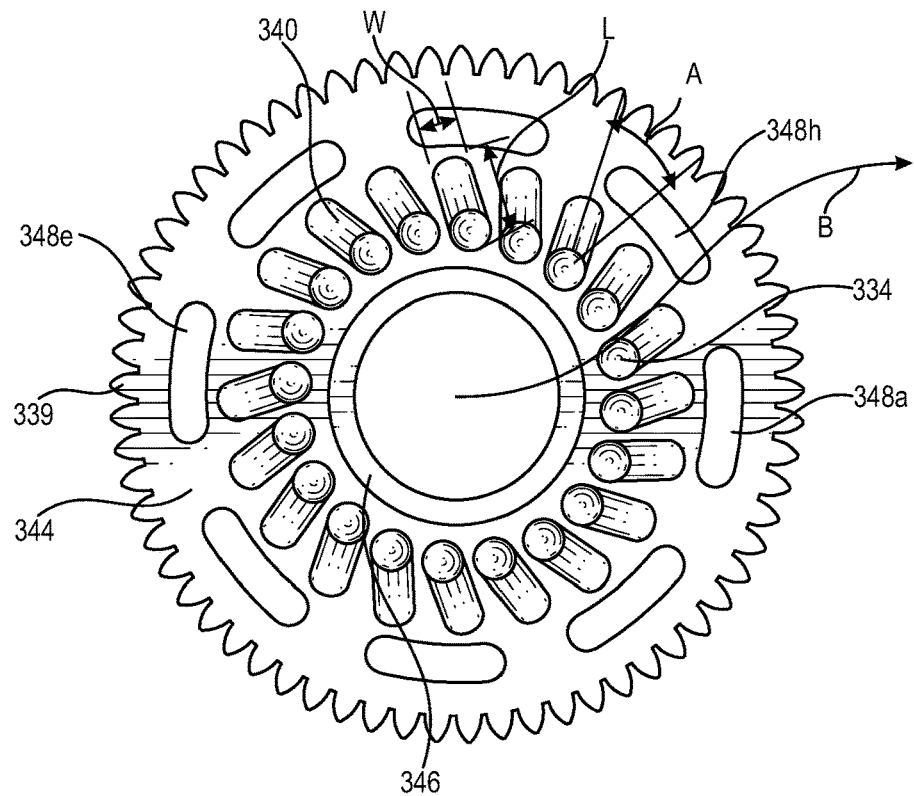
FIG. 10 is a front view of the FIG. 7 embodiment with the secondary gear and the thrust washer removed for clarity.
Figure 11:
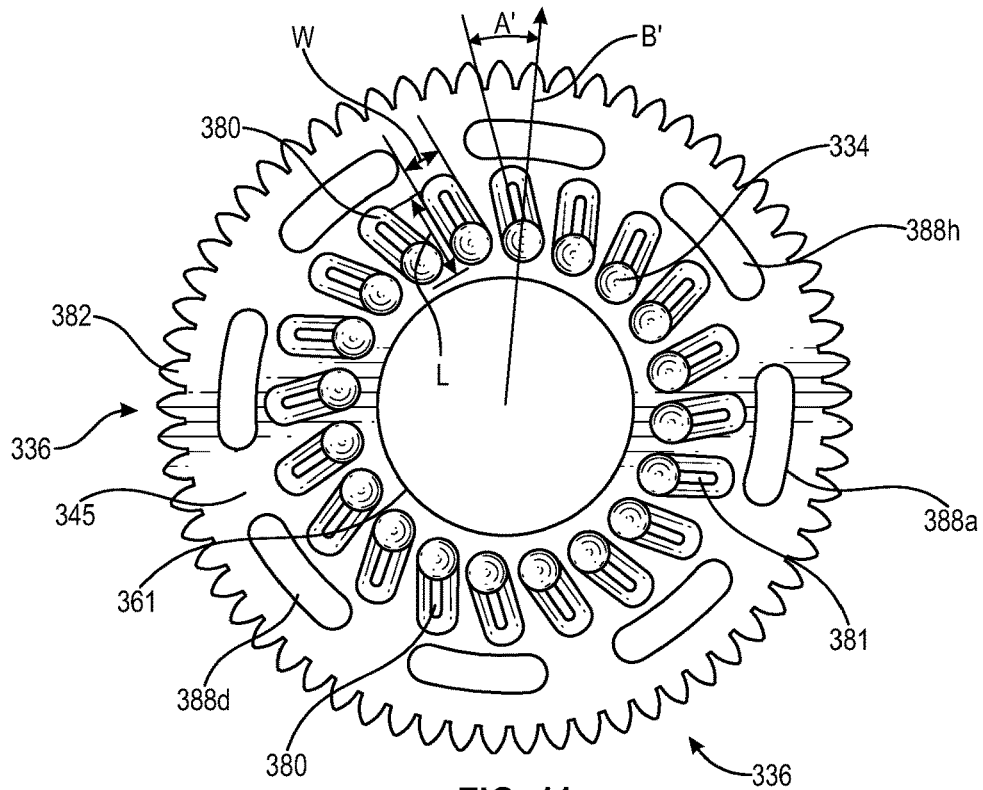
FIG. 11 is a rear view of the FIG. 7 embodiment with the main gear and the thrust washer removed for clarity.
Figure 12:
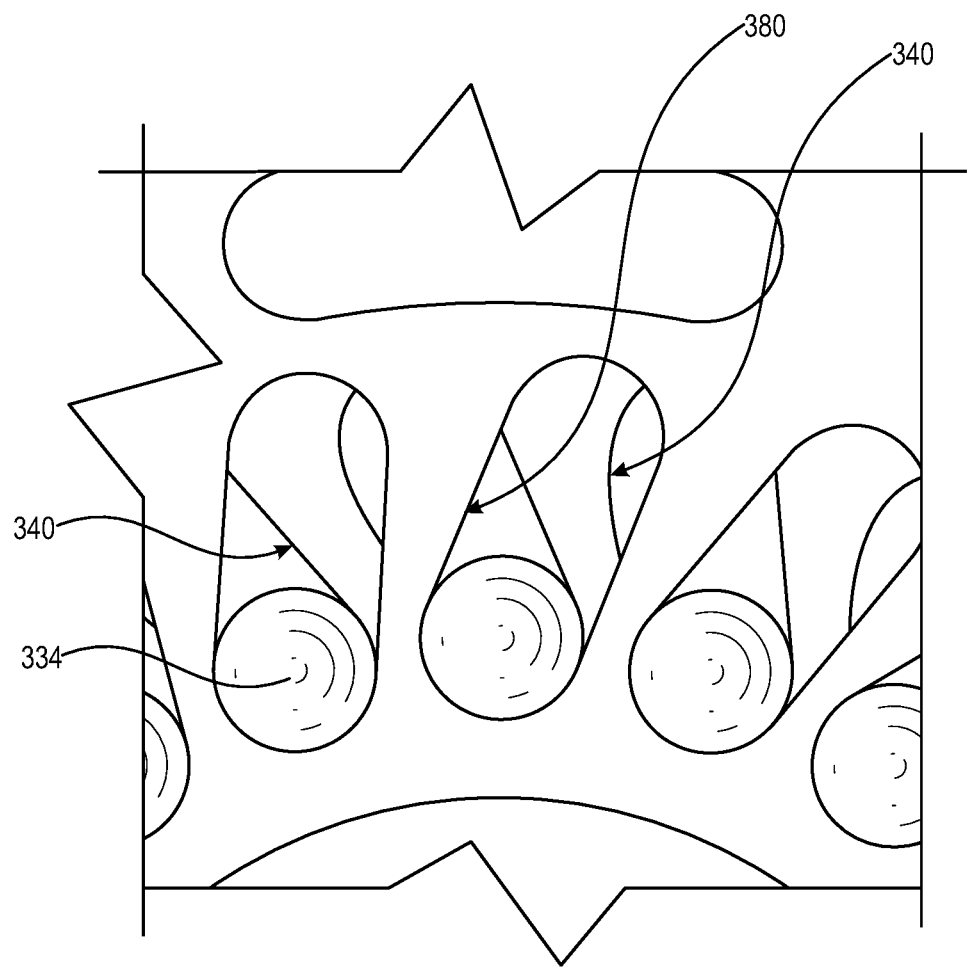
FIG. 12 is a partial view of the FIG. 7 embodiment.

The plurality of secondary gear trenches or channels 380 are configured to receive a corresponding number of the plurality of weighted balls 334 such that each of the secondary gear trenches 380 receives one of the weighted balls 334. Each of the plurality of secondary gear trenches 380 is the same therefore only a single trench will be described next. The secondary gear trench 380 is positioned on a trench angle A' relative to a line B' measured from a central axis through the center of the secondary gear 336. The trench angle A' is equal to the trench angle A of the main gear 344 however when the main gear 344 is assembled with the secondary gear 336 the trench angle A' will be opposite in orientation to the trench angle A, as illustrated in FIGS. 8, 9, and 12. The secondary gear trench 380 has a width W that corresponds to the diameter of the weighted ball 334. The secondary gear trench 380 has a length L that facilitates an amount of torque that is desired for application to the secondary gear 336. The secondary gear trench 380 has a depth that corresponds to a radius of the weighted ball 334. The secondary gear trench 380 includes a slit 381 for airflow to further enable movement of the weighted ball 334.

Each of the weighted balls 334 are of the same shape, size, and weight or mass and include similar details. In another embodiment, the scissor gear assembly 330 can include more or less weighted balls 334 than illustrated in FIGS. 7-12. The weighted balls 334 have a diameter that corresponds to the width W of the main gear trench 340 and the width W of the secondary gear trench 380. The weighted balls 334 are positioned in the trenches 340 and 380 to roll along the length of the trenches 340 and 380 when the engine is operational. As such, the main and secondary gears 332 and 336, respectively, have trenches 340 and 380, respectively, that are at an angle A and A' that are opposite of each other such that the weighted balls 334 move along the length of the trenches 340 and 380 toward the outer edges of the gears 332 and 336 when the scissor gear assembly 300 is rotating. When the weighted balls 334 move in the grooved channels or trenches 340 and 380, the offset angles A and A' are forced to align such that the trenches 340 and 380 are aligned because the main and secondary gears 332 and 336, respectively, rotate in opposite directions. The alignment of the trenches 340 and 380 coincides with movement of the secondary gear 336 opposite of movement of the main gear 332 thus removing backlash and maintaining tooth to tooth contact since the plurality of secondary gear teeth 382 will no longer be aligned with the plurality of the main gear teeth 339. When the engine stops operation all of the pressure or bias torque is eliminated on the scissor gear assembly 300 such that the main gear 332 and the secondary gear 336 return to their original position wherein the plurality of secondary gear teeth 382 become aligned with the plurality of the main gear teeth 339 and the orientation of the trenches 340 and 380 return to their original configuration having offset angles A and A' that are opposite of each other because. For example only, if angle A was 30 degrees then angle A' would be −30 degrees however the angles A and A' can be any range and not limited to 30 or −30 degrees.

The offset angles A and A' of the trenches 340 and 380 will prevent the scissor gear assembly 300 from locking when engaged, rather than only one of the trenches 340 and 380 being angled and the other of the trenches 340 and 380 having zero angle. The amount of bias torque on the scissor gear assembly 300 will increase as the engine speed increases making the scissor gear assembly 300 a dynamic scissor gear. Bias torque can be adjusted by changing ball mass and/or position of the plurality of weighted balls 334 such as changing the position, length, or angle A/A' of the trenches 340 and 380. When the engine begins operation, the heavier the mass of the weighted balls 334, the greater the bias torque that is applied to the scissor gear assembly 300.

For assembly of the secondary gear 336 to the main gear 332, the secondary gear 336 slides over the retainer or hub 346 that is integrated to main gear 332 and can be secured by various techniques such as by deformation of the outer diameter of the retainer or hub 346, the thrust washer 338, or by a retaining clip. As illustrated, the thrust washer 338 is assembled on the retainer or hub 346 to hold or retain the secondary gear 336 onto the main gear 332 and the weighted balls 334 are sandwiched between the gears 336 and 332. Due to lack of springs to apply bias torque, there are no special tools or procedures needed for installation of the scissor gear assembly 300 onto the gear system.

As is evident from the figures and text presented above, a variety of aspects of the present disclosure are contemplated.

Various aspects of the present application are contemplated. According to one aspect, a scissor gear assembly, comprising: a main gear having a plurality of main pins; a secondary gear having a plurality of secondary gear holes; and a plurality of weights, each of the plurality of weights defining a pivot hole sized to receive one of the main pins to link each of the plurality of weights to the main gear, each of the plurality of weights having a weight pin that is positioned adjacent the pivot hole, wherein one of the weight pins is engaged with one of the plurality of secondary gear holes to operatively connect the corresponding one of the plurality of weights to the secondary gear, wherein rotation of the main gear in a first direction thereby rotates the plurality of weights about the main pins of the main gear, and further wherein rotation of the plurality of weights forces the secondary gear to rotate in an opposite direction as the main gear.

In one embodiment of the scissor gear assembly, wherein the main gear has a plurality of main gear teeth, the secondary gear has a plurality of secondary gear teeth that are aligned with the plurality of main gear teeth when the main gear is stationary.

In another embodiment of the scissor gear assembly, wherein the plurality of secondary gear teeth are unaligned with the plurality of main gear teeth when the main gear is rotated.

In yet another embodiment of the scissor gear assembly, wherein each of the weights includes an attachment end portion opposite a weighted end portion, the attachment end portion includes the pivot hole adjacent the weight pin.

In another embodiment of the scissor gear assembly, wherein each of the weighted end portions is adjustable to vary an amount of torque applied to the main gear and to the secondary gear when the scissor gear assembly is operational.

In yet another embodiment of the scissor gear assembly, wherein each of the weights includes a first rib offset a distance from a second rib, wherein the first and second ribs extend between the attachment end portion and the weighted end portion to increase a centrifugal force from each of the weights when the scissor gear assembly is operational.

In one embodiment of the scissor gear assembly, wherein the main gear includes a rim that extends around a circumference of the main gear, wherein when the main gear is rotated each of the plurality of weights is thrown outwardly relative to a central axis of the scissor gear assembly and towards the rim to thereby limit movement of the plurality of weights.

According to a second aspect a scissor gear assembly, a scissor gear assembly, comprising: a main gear having a plurality of main gear teeth; a secondary gear having a plurality of secondary gear teeth; a plurality of weights assembled with the main gear and the secondary gear, each of the plurality of weights operably connected to the main gear and the secondary gear; wherein the plurality of main gear teeth are aligned with the plurality of the secondary gear teeth when the main gear is in a resting condition; and wherein rotation of the main gear in a first direction forces the plurality of weights to rotate, and rotation of the plurality of weights forces the secondary gear to rotate in an opposite direction as the first direction of the main gear to thereby rotate the plurality of secondary gear teeth apart from the plurality of main gear teeth.

In another embodiment of the scissor gear assembly, wherein the main gear includes a plurality of main holes; wherein the secondary gear includes a plurality of secondary gear pins; and each of the plurality of weights define a pivot pin sized for insertion into one of the main holes to link each of the plurality of weights to the main gear, each of the plurality of weights having a weight hole that is positioned adjacent the pivot pin, one of the weight holes engaged with one of the plurality of secondary gear pins to operatively connect each of the plurality of weights to the secondary gear.

In one embodiment of the scissor gear assembly, wherein the main gear includes a plurality of main pins; the secondary gear includes a plurality of secondary gear holes; and each of the plurality of weights defines a pivot hole sized to receive one of the main pins to link each of the plurality of weights to the main gear, each of the plurality of weights has a weight pin that is positioned adjacent the pivot hole, wherein one of the weight pins is engaged with one of the plurality of secondary gear holes to operatively connect the corresponding one of the plurality of weights to the secondary gear, wherein rotation of the main gear in a first direction thereby rotates the plurality of weights about the main pins of the main gear, and further wherein rotation of the plurality of weights forces the secondary gear to rotate in an opposite direction as the main gear.

In one embodiment of the scissor gear assembly, wherein each of the weights includes an attachment end portion opposite a weighted end portion, the attachment end portion includes the pivot hole adjacent the weight pin.

In another embodiment of the scissor gear assembly, wherein each of the weighted end portions is adjustable to vary an amount of torque applied to the main gear and to the secondary gear when the scissor gear assembly is operational.

In yet another embodiment of the scissor gear assembly, wherein each of the weights includes a first rib offset a distance from a second rib, wherein the first and second ribs extend between the attachment end portion and the weighted end portion to increase a centrifugal force from each of the weights when the scissor gear assembly is operational.

In one embodiment of the scissor gear assembly, wherein the main gear includes a rim that extends around a circumference of the main gear, wherein when the main gear is rotated each of the plurality of weights is thrown outwardly relative to a central axis of the scissor gear assembly and towards the rim to thereby limit movement of the plurality of weights.

According to a third aspect, a scissor gear assembly, comprising: a main gear having a plurality of main gear trenches; a secondary gear having a plurality of secondary gear trenches, the plurality of secondary gear trenches having a similar length and width as the plurality of main gear trenches; and a plurality of weights assembled between the main gear and the secondary gear, wherein one of the plurality of weights is partially captured in one of the plurality of main gear trenches and partially captured in one of the plurality of secondary gear trenches, wherein rotation of the main gear in a first direction forces the plurality of weights to move along the plurality of secondary gear trenches and the plurality of main gear trenches, and further wherein movement of the plurality of weights forces the secondary gear to rotate in an opposite direction as the main gear.

In one embodiment of the scissor gear assembly, wherein each of the plurality of main gear trenches are positioned on a trench angle relative to a line measured from a central axis through a center of the main gear, wherein each of the plurality of secondary gear trenches are positioned on a trench angle relative to a line measured from a central axis through a center of the secondary gear, and wherein the trench angles of the plurality of secondary gear trenches are equal to the trench angles of the plurality of main gear trenches.

In one embodiment of the scissor gear assembly, wherein when the main gear is assembled with the secondary gear, the trench angles of the plurality of secondary gear trenches are opposite in orientation to the trench angles of the plurality of main gear trenches.

In one embodiment of the scissor gear assembly, wherein movement of the plurality of weights along the plurality of secondary gear trenches and the plurality of main gear trenches aligns the trench angles of the plurality of secondary gear trenches with the trench angles of the plurality of main gear trenches.

In one embodiment of the scissor gear assembly, wherein the main gear includes a plurality of main gear openings, the secondary gear includes a plurality of secondary gear openings that are substantially similar the plurality of main gear openings, wherein the plurality of main gear openings and the plurality of secondary gear openings are aligned when the secondary gear and the main gear are in a resting position.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A scissor gear assembly, comprising:
a main gear having a plurality of main pins;
a secondary gear having a plurality of secondary gear holes; and
a plurality of weights, each of the plurality of weights defining a pivot hole sized to receive one of the main pins to link each of the plurality of weights to the main gear, each of the plurality of weights having a weight pin that is positioned adjacent the pivot hole, wherein one of the weight pins is engaged with one of the plurality of secondary gear holes to operatively connect the corresponding one of the plurality of weights to the secondary gear,
wherein rotation of the main gear in a first direction thereby rotates the plurality of weights about the main pins of the main gear, and further wherein rotation of the plurality of weights forces the secondary gear to rotate in an opposite direction as the main gear.

2. The scissor gear assembly of claim 1, wherein the main gear has a plurality of main gear teeth, the secondary gear has a plurality of secondary gear teeth that are aligned with the plurality of main gear teeth when the main gear is stationary.

3. The scissor gear assembly of claim 2, wherein the plurality of secondary gear teeth are unaligned with the plurality of main gear teeth when the main gear is rotated.

4. The scissor gear assembly of claim 1, wherein each of the weights includes an attachment end portion opposite a weighted end portion, the attachment end portion includes the pivot hole adjacent the weight pin.

5. The scissor gear assembly of claim 4, wherein each of the weighted end portions is adjustable to vary an amount of torque applied to the main gear and to the secondary gear when the scissor gear assembly is operational.

6. The scissor gear assembly of claim 4, wherein each of the weights includes a first rib offset a distance from a second rib, wherein the first and second ribs extend between the attachment end portion and the weighted end portion to increase a centrifugal force from each of the weights when the scissor gear assembly is operational.

7. The scissor gear assembly of claim 6, wherein each of the weights includes an opening positioned between the first and second ribs.

8. The scissor gear assembly of claim 1, wherein the main gear includes a rim that extends around a circumference of the main gear, wherein when the main gear is rotated each of the plurality of weights is thrown outwardly relative to a central axis of the scissor gear assembly and towards the rim to thereby limit movement of the plurality of weights.

9. A scissor gear assembly, comprising:
a main gear having a plurality of main gear teeth and a plurality of main holes;
a secondary gear having a plurality of secondary gear teeth and a plurality of secondary gear pins;
a plurality of weights assembled with the main gear and the secondary gear, each of the plurality of weights operably connected to the main gear and the secondary gear wherein each of the plurality of weights define a pivot pin sized for insertion into one of the main holes to link each of the plurality of weights to the main gear, each of the plurality of weights having a weight hole that is positioned adjacent the pivot pin, one of the weight holes engaged with one of the plurality of secondary gear pins to operatively connect each of the plurality of weights to the secondary gear;
wherein the plurality of main gear teeth are aligned with the plurality of the secondary gear teeth when the main gear is in a resting condition; and
wherein rotation of the main gear in a first direction forces the plurality of weights to rotate, and rotation of the plurality of weights forces the secondary gear to rotate in an opposite direction as the first direction of the main gear to thereby rotate the plurality of secondary gear teeth apart from the plurality of main gear teeth.

10. The scissor gear assembly of claim 9, wherein each of the weights includes an attachment end portion opposite a weighted end portion, wherein each of the weighted end portions is adjustable to vary an amount of torque applied to the main gear and to the secondary gear when the scissor gear assembly is operational.

11. The scissor gear assembly of claim 10, wherein each of the weights includes a first rib offset a distance from a second rib, wherein the first and second ribs extend between the attachment end portion and the weighted end portion to increase a centrifugal force from each of the weights when the scissor gear assembly is operational.

12. The scissor gear assembly of claim 9, wherein the main gear includes a rim that extends around a circumference of the main gear, wherein when the main gear is rotated each of the plurality of weights is thrown outwardly relative to a central axis of the scissor gear assembly and towards the rim to thereby limit movement of the plurality of weights.

13. The scissor gear assembly of claim 9, wherein the main gear includes at least one main gear opening, and wherein the secondary gear includes at least one secondary gear opening.

14. The scissor gear assembly of claim 9, wherein the main gear includes a retainer;
wherein the secondary gear includes a secondary opening sized to receive the retainer therein; and
a thrust washer assembled with the retainer.

15. A scissor gear assembly, comprising:
a main gear having a plurality of main gear teeth and a plurality of main pins;

a secondary gear having a plurality of secondary gear teeth and a plurality of secondary gear holes; and a plurality of weights assembled with the main gear and the secondary gear, each of the plurality of weights defines a pivot hole sized to receive one of the main pins to link each of the plurality of weights to the main gear, each of the plurality of weights has a weight pin that is positioned adjacent the pivot hole, wherein one of the weight pins is engaged with one of the plurality of secondary gear holes to operatively connect the corresponding one of the plurality of weights to the secondary gear, wherein rotation of the main gear in a first direction thereby rotates the plurality of weights about the main pins of the main gear, and further wherein rotation of the plurality of weights forces the secondary gear to rotate in an opposite direction as the main gear.

16. The scissor gear assembly of claim 15, wherein each of the weights includes an attachment end portion opposite a weighted end portion, the attachment end portion includes the pivot hole adjacent the weight pin.

17. The scissor gear assembly of claim 16, wherein each of the weighted end portions is adjustable to vary an amount of torque applied to the main gear and to the secondary gear when the scissor gear assembly is operational.

18. The scissor gear assembly of claim 16, wherein each of the weights includes a first rib offset a distance from a second rib, wherein the first and second ribs extend between the attachment end portion and the weighted end portion to increase a centrifugal force from each of the weights when the scissor gear assembly is operational.

19. The scissor gear assembly of claim 15, wherein the main gear includes a rim that extends around a circumference of the main gear, wherein when the main gear is rotated each of the plurality of weights is thrown outwardly relative to a central axis of the scissor gear assembly and towards the rim to thereby limit movement of the plurality of weights.

* * * * *